United States Patent [19]

Arai et al.

[11] Patent Number: 4,649,458
[45] Date of Patent: Mar. 10, 1987

[54] CONTROL CIRCUITS FOR ELECTROMAGNETIC COUPLING APPARATUS

[75] Inventors: Shigeharu Arai, Ashikaga; Minoru Otsuka, Kiryu, both of Japan

[73] Assignee: Ogura Clutch, Gunma, Japan

[21] Appl. No.: 709,159

[22] Filed: Mar. 7, 1985

[30] Foreign Application Priority Data

Mar. 9, 1984 [JP]  Japan .................................. 59-43879
Mar. 12, 1984 [JP]  Japan .................................. 59-45697

[51] Int. Cl.⁴ ........................................... F16D 27/16
[52] U.S. Cl. .................. 361/152; 192/84 R; 361/196; 361/203
[58] Field of Search ............... 361/152, 195, 196, 203; 192/40, 48.2, 84 R; 307/595, 602

[56] References Cited

U.S. PATENT DOCUMENTS 3,953,867  4/1976  Kondo .......................... 361/196 X
4,012,673  3/1977  Sarrem et al. .................. 361/196
4,044,272  8/1977  Darrow ........................... 361/203 X
4,377,223  3/1983  Salsakiyama et al. ........ 192/84 R X
4,509,091  4/1985  Booth ........................... 192/84 R X

FOREIGN PATENT DOCUMENTS 22293  7/1972  Japan .
15647  5/1973  Japan .

Primary Examiner—Michael L. Gellner
Attorney, Agent, or Firm—Townsend & Townsend

[57] ABSTRACT

The control circuit for use with an electromagnetic coupling apparatus comprises a timer started when a power source switch is closed, an oscillator started by the switch and stopped by the timer, and a drive circuit which intermittently passes current through an exciting coil of the electromagnetic coupling apparatus in accordance with the oscillation output of the oscillator and continuously passes current through the exciting coil when the oscillation output is stopped.

1 Claim, 8 Drawing Figures

CONTROL CIRCUITS FOR ELECTROMAGNETIC COUPLING APPARATUS

BACKGROUND OF THE INVENTION

This invention relates to a control circuit for controlling such electric coupling apparatus as an electromagnetic clutch and an electromagnetic brake.

Electromagnetic coupling apparatus effecting buffer coupling are disclosed in Japanese Utility Model Publication Nos. 22293/1972 and 15647/1973 by the same applicant as the present application. The electromagnetic coupling apparatus disclosed in these utility model publications comprise a plurality of armatures and the number of attracted armatures is gradually increased according to the excitation of an exciting coil. However, where the load driven by the electromagnetic coupling apparatus varies greatly, as an armature is initially attracted, a friction noise is generated or a sufficient coupling force is not obtained with the result that coupling is delayed, thus failing to provide desired buffer coupling.

In the past, a simple switch has been used for controlling the electromagnetic coupling apparatus such that the current flowing through the exciting coil can be ON-OFF controlled. Such a control device can not eliminate the problem described above and the advent of an improved control circuit has been desired which is structurally improved and suitable for buffer coupling.

SUMMARY OF THE INVENTION

It is an object of this invention to provide an improved control circuit for electromagnetic coupling apparatus capable of providing an efficient buffer coupling function without producing noise and coupling delay.

According to one embodiment of this invention, there is provided a control circuit for electromagnetic coupling apparatus comprising a timer which is started by an operation of a power source switch, an oscillator which starts to send out a pulse shaped oscillation output in response to the operation of the switch and stops sending out of the oscillation output in response to a time up of the timer, and a drive circuit which intermittently passes current through the exciting coil of the electromagnetic coupling apparatus in accordance with the oscillation output of the oscillator and continuously passes current through the exciting coil when the oscillator output is stopped.

According to a modified embodiment of this invention, there is provided a control circuit for electromagentic coupling apparatus comprising a timer which is started by an operation of a power source switch for sequentially producing first and second time up outputs, an oscillator which starts sending out of a pulse shaped oscillation output in response to the first time up output and stops sending out of the oscillation output in response to the second time up output, and a drive circuit responsive to the operation of the switch to continuously pass current through the exciting coil of the electromagnetic coupling apparatus before starting and after stopping sending out of the oscillation output and to intermittently pass current to the exciting coil in accordance with the oscillation output of the oscillator while the oscillation output is being sent out.

According to another modification of this invention, there is provided a control circuit for electromagnetic coupling apparatus comprising a timer which is started when a power source switch is operated for sequentially producing a plurality of timer up outputs, an oscillator which sends out an oscillation output when the switch is operated and stops sending out of the oscillation output when the last one of the time up outputs is produced, a pulse generator driven by the output of the oscillator for producing a pulse output and varying a duty ratio of the pulse output in accordacne with the time up outputs except the last one thereof, and a drive circuit responsive to the output of the pulse generator to intermittently pass current through the exciting coil of the electromagnetic coupling apparatus and to continuously pass the current through the exciting coil when sending out of the oscillation output is stopped.

DESCRIPTION OF THE PREFERRED EMBODIMENTS

Figure 1:
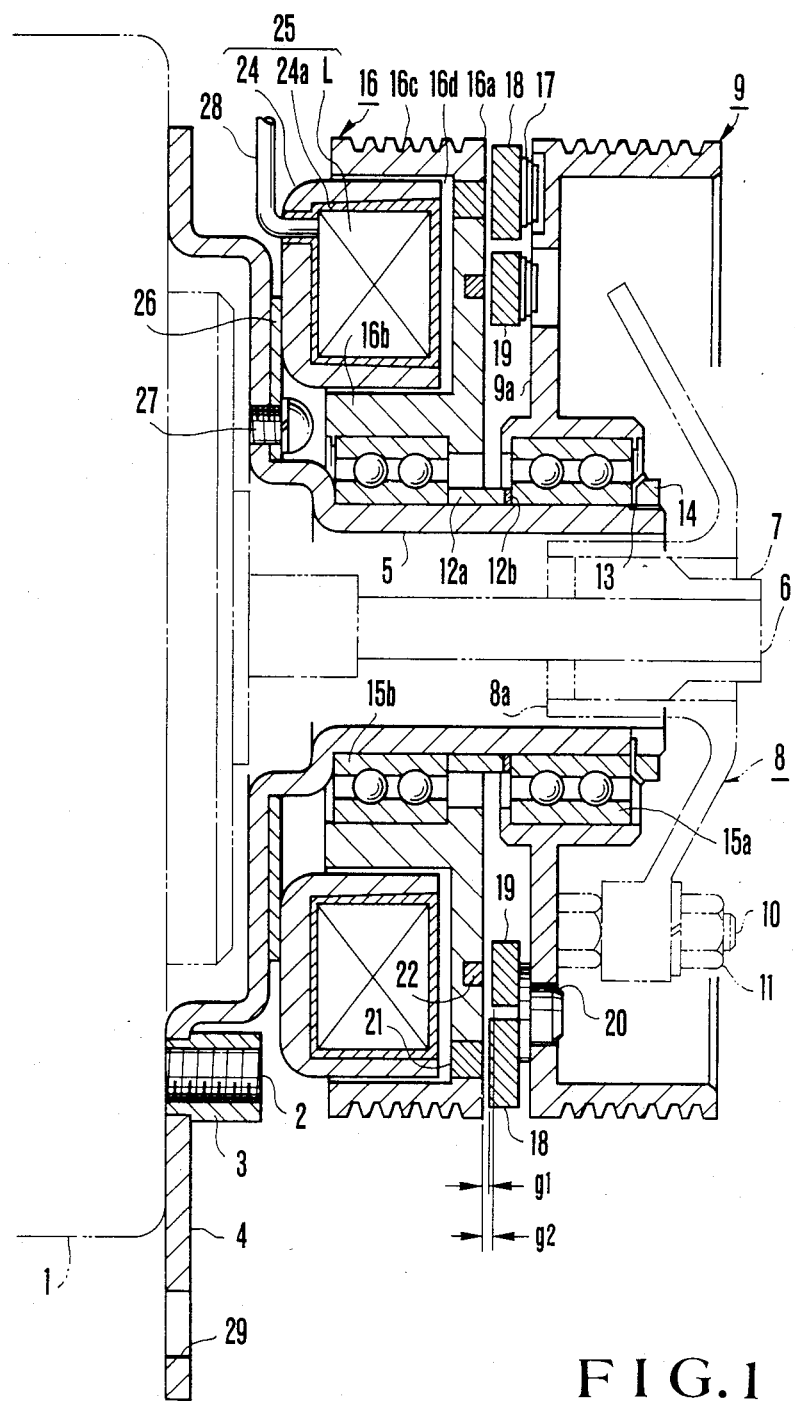
FIG. 1 is a longitudinal sectional view of an electromagnetic coupling apparatus to which the control circuit embodying the invention is applicable.

An electromagnetic coupling apparatus to which the control circuit of this invention is applicable will first be described with reference to FIG. 1 in which a center housing 4, triangular in plan view form, is secured to a load device 1, for example, an electric generator or pump, by tightening nuts 3 on threaded studs 2 which project from the load device 1. An input shaft 6 of the load device 1 is contained in a cylindrical projection 5 at substantially the central portion of the housing 4. A hub 7 in the form of a hexagonal pillar is secured by a pin or the like to a tip of the input shaft 6 projecting beyond the end of the cylindrical projection 5.

A dish shaped coupling member 8 has a boss 8a formed with an inner hole corresponding to an outer periphery of the hub 7, and is fitted on the hub 7 and connected with an input pulley 9 by means of three bolts 10 and nuts 11, for transmitting the rotation of the input pulley 9 to the input shaft 6.

Figure 2:
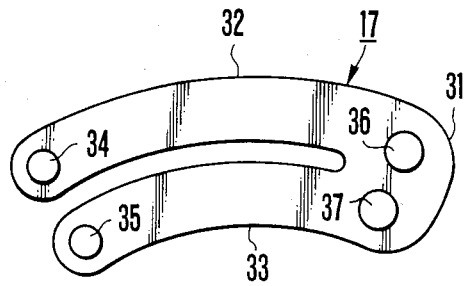
FIG. 2 is a plan view showing a spring utilized in the coupling apparatus shown in FIG. 1.

The input pulley 9 is rotatably supported by a bearing 15a mounted on the outer periphery of the cylindrical projection 5 by means of a collar 12a, a shim 12b, a washer 13 and a nut 14. First and second annular armatures 18 and 19 are mounted at three portions, through a spring 17, arcuate as shown in FIG. 2, on the surface 9a of the input pulley 9 opposing an output pulley 16 supported by a bearing 15b. The gaps $g_1$ and $g_2$ between the armatures and the surface 16a opposing thereto are selected to have a relation $g_1 < g_2$, the gaps being adjustable by a stop member 20 with its head inserted into a perforation passing through the side surface 9a of the input pulley 9.

The output pulley 16 comprises a main body including the side surface 16a and a sleeve 16b, and an annular peripheral portion 16c. A nonmagnetic member 21 made of copper or resin is filled in a cavity in surface 16a opposing the first armature 18. A circular groove is also formed in the side surface 16a at a position opposing the second armature 19 and the groove is filled with a nonmagnetic member 22. On the opposite surface of the side surface 16a is formed an annular recess 16a for receiving an electromagnet 25 comprising an exciting coil L, a core 24 and a filler 24a consisting of resin or the like, the magnet 25 being accommodated with a gap between it and the inner surface of the output pulley 16.

The magnet 25 is secured to the center housing 4 by three screws 27 through a supporting plate 26 integral with the core 24, and current is supplied to the exciting coil through two lead wires 28.

The shim 12b is used for adjusting the gap between the input pulley 9 and the output pulley 16, thereby setting the gaps $g_1$ and $g_2$.

Elongated slots 29 are formed in respective arms of the triangular center housing 4 for mounting the coupler to a braket of the load device 1 by bolts applied to extend through these slots. The tension of the belts, not shown, passing around the pulleys 9 and 16 can be adjusted by adjusting a position in the slot at which the bolt is applied.

FIG. 2 is a plan view showing the spring 17 comprising a common base portion 31 and two arcurate branch portions 32 and 33 extending from the opposite ends of the base portion 31. At the front ends of the branch portions 32 and 33 are formed perforations for holding the armatures 18 and 19 by calking, while perforations 36 and 37 are provided for the base portion 31 for securing the spring 17 to the side surface 9a of input pully 9 by rivet or screws.

In operation, when the output pulley 16 is driven by a bell not shown and current is passed through the exciting coil L, the armature 18 is firstly attracted by the opposing surface 16a and then the armature 19 is attracted. Due to such sequential attraction, the coupling force between the pulleys 16 and 9 increases so that successively increasing driving force would be applied to the input pulley 9 whereby the input shaft 6 of the load device 1 begins to rotate under the buffer coupling.

Thanks to the interposition of the nonmagnetic members 21 and 22, a large quantity of magnetic flux passes through the armatures 18 and 19 when they are attracted, thereby increasing the attractive force. Particularly, since the sizes of the armature 18 and the nonmagnetic member 21 are made larger than those of the armature 19 and nonmagnetic member 22, the attractive force of the armature 18 is larger than that of armature 19, whereby a large starting torque can be obtained.

When the current flowing through the exciting coil L is interrupted, the attractive force disappears so that the spring 17 restores the armatures 18 and 19 to their original positions, thus releasing the coupling.

Where the coupler is used as an electromagnetic brake, the load device 1 is an object to be braked and the output pulley 16 is fixed so as to effect buffer braking when the exciting coil L is excited.

Figure 3:
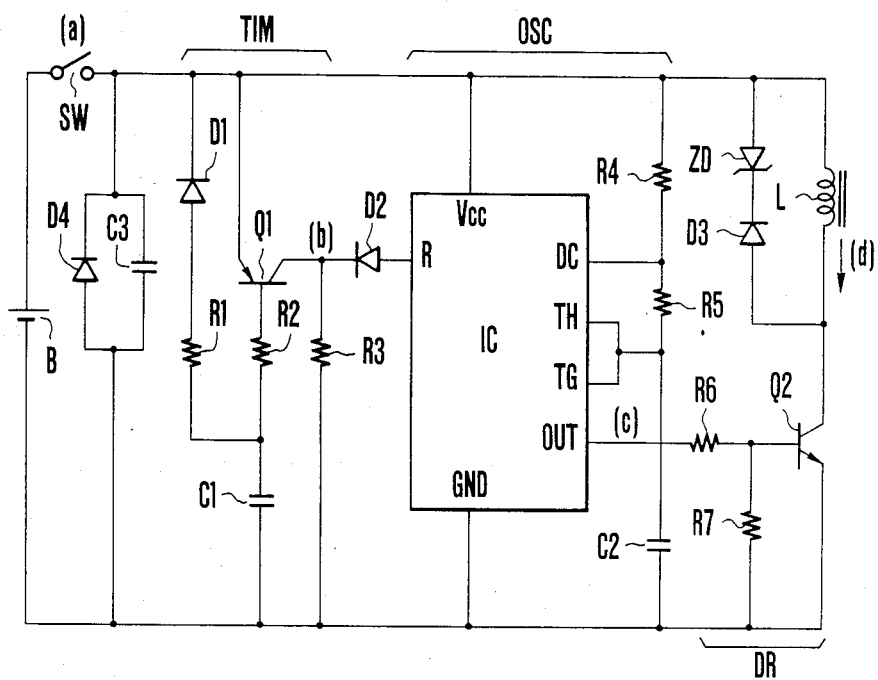
FIG. 3 is a circuit diagram showing a first embodiment of the control circuit of this invention.
Figure 4:
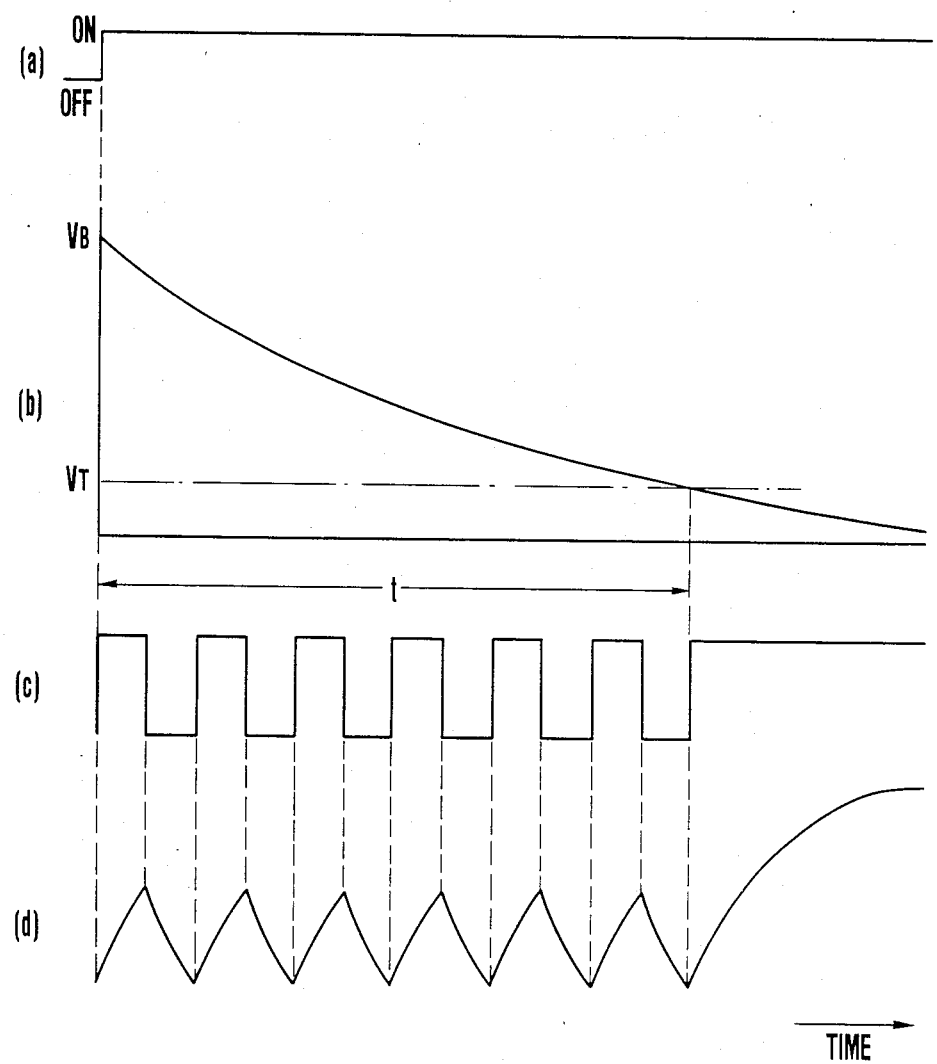
FIG. 4 is a timing chart showing waveforms at various parts shown in FIG. 3.

FIG. 3 shows a circuit diagram of a control circuit utilized for the electromagnetic coupling apparatus described above in which a diode $D_1$, resistors $R_1$ to $R_3$, a transistor $Q_1$ and a capacitor $C_1$ constitute a timer TIM. When a switch SW is closed as shown at section (a) in FIG. 4, the capacitor Cl is charged from a power source B via the emitter/base path of transistor $Q_1$ and resistor $R_2$. Thus, a charging current which gradually decreases mainly dependent upon a time constant determined by the values of resistor $R_2$ and capacitor $C_1$ flows through the base of transistor $Q_1$ whereby the resistance between the collector and emitter of transistor $Q_1$ increases gradually from its small initial value. Upon completion of the charging of the transistor $C_1$, the transistor $Q_1$ becomes OFF. Consequently, as shown at section (b) in FIG. 4, the collector voltage determined by the voltage division ratio between resistor $R_3$ and collector/emitter resistance of transistor $Q_1$ initially becomes substantially equal to the voltage $V_B$ of the power source B and then decreases gradually, and the decreased voltage is sent out as a time up output through a reverse voltage blocking diode $D_2$.

The charge accummulated in the capacitor $C_1$ discharges through resistor $R_1$ and diode $D_1$ when switch SW is opened. When the switch SW is re-closed the operation described above is repeated.

An oscillator OSC is constituted by an intergrated circuit IC of the free running multivibrator type, resistors $R_4$ and $R_5$ and a capacitor $C_2$. This oscillator begins to oscillate when switch SW is closed to produce a pulse shaped output (c).

More particularly, when the output terminal OUT is at a high level "H", the discharge terminal DC is in the OFF state to charge the capacitor $C_2$ via resistors $R_4$ and $R_5$ so that the terminal voltage of the capacitor $C_2$ increases gradually in accordance with the time constant determined by these circuit elements. When the terminal voltage reaches a discharge threshold value set in the integrated circuit IC, this terminal voltage of the capacitor $C_2$ develops at the trigger terminal TG and the threshold terminal TH of the intergrated circuit IC so that the discharge terminal DC is energized and the output terminal OUT is changed to a low level "L". Thus the charge of the capacitor $C_2$ discharges through resistor $R_5$ and discharge terminal DC so that the terminal voltage of the capacitor $C_2$ gradually decreases in accordance with the time constant determined by these circuit elements.

When the terminal voltage of capacitor $C_2$ decreases to a charge threshold level which is set in the same manner as the discharge threshold level, the discharge terminal DC is deenergized while at the same time the output terminal OUT again changes to "H" and the charging is made in the same manner as described above to repeat the operation described above.

Accordingly, the output terminal OUT sends out a pulse shaped oscillation output (c) having a fequency and duty cycle determined by the values of resistors $R_4$ and $R_5$ and capacitor $C_2$.

The reset terminal R of the integrated circuit IC is connected to the collector of transistor $Q_1$ via diode $D_2$. When the collector voltage of the transistor $Q_1$ decreases to the response threshold level $V_T$ at the "L" level, the oscillator would be reset to terminate its oscillation.

The oscillation output (c) is supplied to a drive circuit DR made up of resistors $R_6$ and $R_7$ and a transistor $Q_2$ so as to turn ON transistor $Q_2$ only when the oscillation output (c) is at the "H" level. Consequently, current (d) flows intermittently through the exciting winding L of the electromagnetic coupling apparatus shown in FIG. 1.

However, due to an inductance component of the exciting winding L, the current increases gradually and due to the action of the inductance component and diode $D_3$ and a constant voltage diode ZD which are connected in parallel with the exciting coil L, the current also decreases gradually, thus producing a sawtooth shaped current.

When the collector voltage (b) of the transistor $Q_1$ becomes the "L" level, the output of the oscillator OSC is stopped so as to maintain the output terminal OUT at the "H" level. Consequently, transistor $Q_2$ of drive circuit DR is still maintained ON to continuously pass current through the exciting winding L, thus making the exciting power maximum.

Consequently, the exciting coil L is excited with a low power level between closure of switch SW and lapse of time t, but with the maximum power after time t so as to sequentially attract armatures 18 and 19 shown in FIG. 1. In other words, at the initial stage, the attractive force is small to permit smooth slip of the armature with respect to the output pulley so that generation of the friction noise can be prevented and with increase of the exciting power, attraction can be perfected, thus realizing satisfactory cushion coupling.

It should be appreciated that the constant voltage diode ZD and diode $D_3$ function to absorb back electromotive force created at the time of interrupting the current flowing through the exciting winding L and to limit the exciting winding LO and to limit the period of time for passage of surge current due to back electromotive force by the Zener voltage of the constant voltage diode ZD, thereby controlling the fall time of the current (d).

A capacitor $C_3$ and a diode $D_4$ are used to bypass noise components otherwise flowing to the power source circuit, thereby preventing erroneous operations at various parts.

Figure 5:
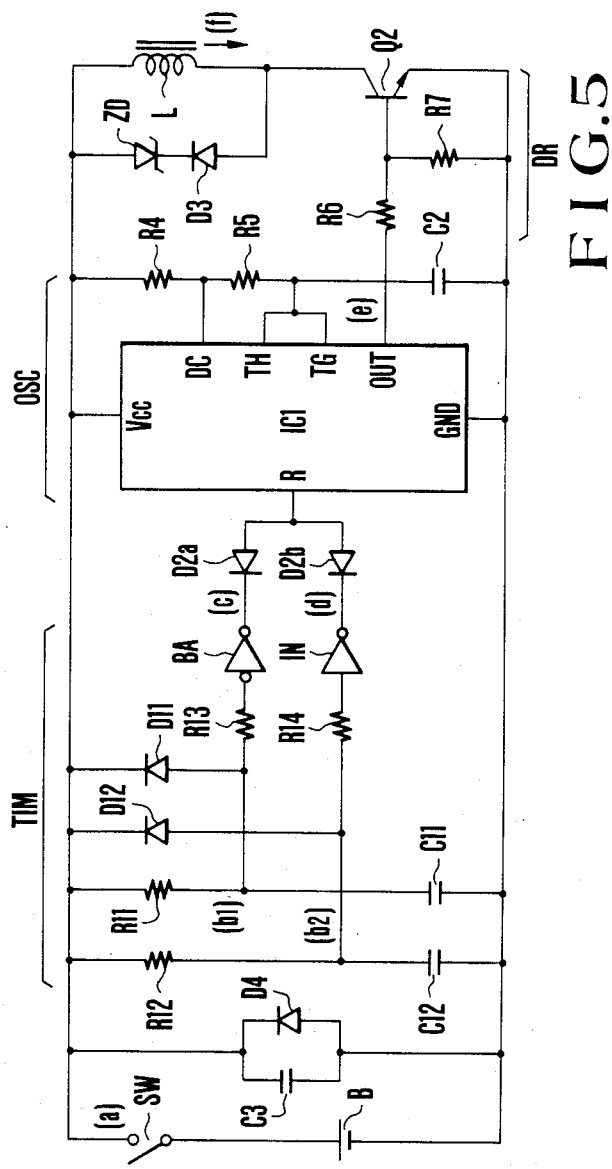
FIG. 5 is a circuit diagram showing a second embodiment of this invention.

In FIG. 5, showing a modified embodiment of the invention, resistors $R_{11}$ to $R_{14}$, capacitors $C_{11}$ and $C_{12}$, a buffer amplifier BA and an inverter IN constitute a timer TIM. Other elements are identical to those shown in FIG. 3.

When the switch SW is closed, capacitors $C_{11}$ and $C_{12}$ are charged respectively through resistors $R_{11}$ and $R_{12}$ and gradually increasing terminal voltages ($b_1$) and ($b_2$) of the capacitors $C_{11}$ and $C_{12}$ are applied to the input terminals of buffer amplifier BA and inverter IN respectively through resistors $R_{13}$ and $R_{14}$.

Figure 6:
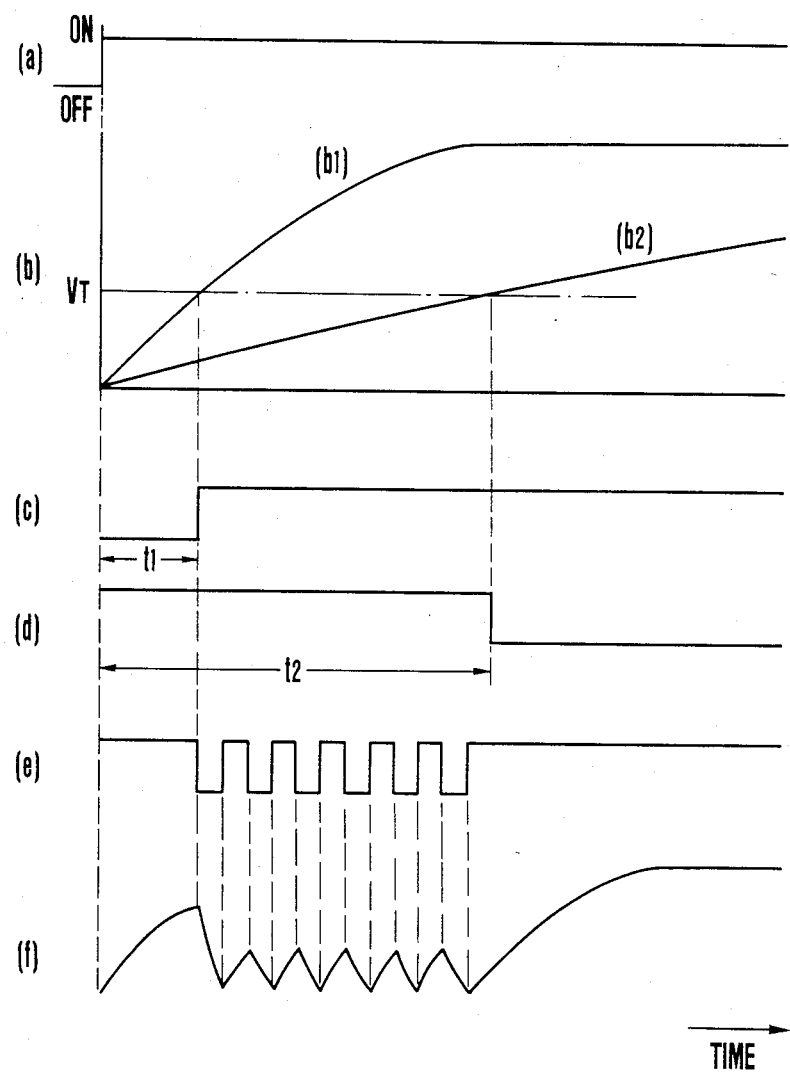
FIG. 6 is a timing chart showing waveforms at various parts shown in FIG. 5.

The time constant determined by capacitor $C_{11}$ and resistor $R_{11}$ is smaller than that by capacitor $C_{12}$ and resistor $R_{12}$ so that as shown at (b) in FIG. 6, the terminal voltage ($b_1$) reaches the responce thereshold level $V_1$ of the buffer amplifier BA earlier than the terminal voltage ($b_2$). Similarly, the terminal voltage ($b_2$) is also applied to the inverter IN. Consequently, the output (c) of the buffer BA changes to the "H" level after time $t_1$ following the closure of switch SW, and the output (d) of the inverter IN changes to the "L" level after lapse of time $t_2$. The outputs (c) and (d) are sequentially produced as the first and second time up outputs.

When the switch SW is opened, the charge of capacitors $C_{11}$ and $C_{12}$ discharge through diodes $D_{11}$ and $D_{12}$ respectively, so that when switch is again closed, the operation described above is repeated.

For this reason, the reset terminal R of an integrated circuit $IC_1$ connected to the output terminals of the buffer amplifier BA and inverter IN via reverse current blocking diodes $D_{2a}$ and $D_{2b}$ becomes the "H" level only during a time interval ($t_2-t_1$). Thus, after lapse of time $t_1$, the oscillator OSC begins to oscillate and after lapse of time $t_2$, the oscillation is stopped.

Accordingly, the drive circuit DR continuously passes current before and after sending out of the oscillation output (e), while during the issuance of the oscillation output (e), the drive circuit DR intermittently passes current (f). Such a waveform variation results in a delay similar to FIG. 4. However, immediately after closure of switch SW, the exciting coil is energized with a relatively large electric power level, then with a low power followed by a maximum power level. As a result, when the switch SW is closed, a larger attractive force than that obtained by the FIG. 3 circuit is created so that satisfactory initial coupling can be assured even when the voltage of the power source B decreases or the gaps $g_1$ and $g_2$ shown in FIG. 1 increase, thereby providing a stable operation of the electromagnetic coupling apparatus.

Figure 8:
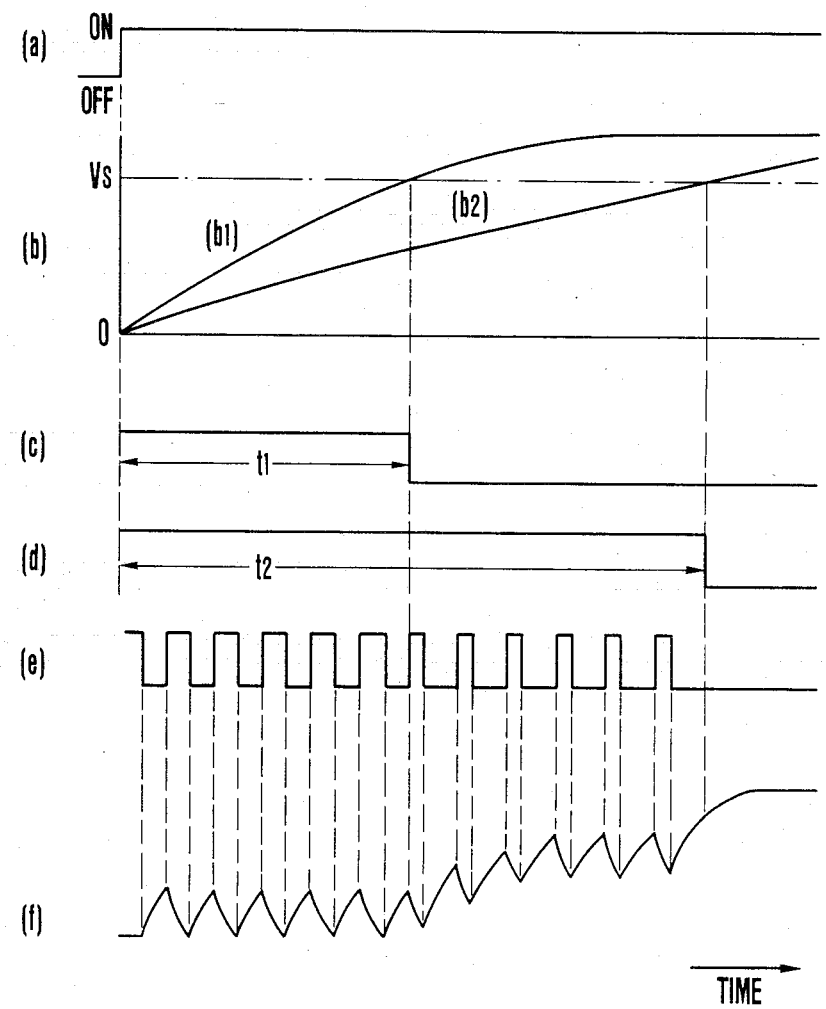
FIG. 8 is a timing chart showing waveforms at various parts shown in FIG. 7.

FIG. 8 shows a third embodiment of the control circuit according to this invention in which a timer TIM is constituted by comparators $CP_{21}$ and $CP_{22}$, resistors $R_{21}$ to $R_{26}$, capacitors $C_{21}$ and $C_{22}$, and diodes $D_{21}$ and $D_{22}$. In operation, when switch SW is closed as shown at (a) in FIG. 8 to connect the DC power source B, a reference voltage $V_S$ obtained by dividing the power source voltage by means of the resistors $R_{23}$ and $R_{24}$ is applied to one input (non-inverting) of each of the comparators $CP_{21}$ and $CP_{22}$ and the capacitors $C_{21}$ and $C_{22}$ are charged respectively through resistors $R_{22}$ and $R_{25}$ whereby gradually increasing terminal voltages of capacitors $C_{21}$ and $C_{22}$ are applied to the other input (inverting) of each of the comparators $CP_{21}$ and $CP_{22}$ to act as voltages to be compared ($b_1$ and $b_2$).

The time constant of capacitor $C_{21}$ and resistor $R_{22}$ is larger than that of capacitor $C_{22}$ and resistor $R_{25}$ so that as shown at (b) in FIG. 8, the voltage $b_1$ reaches the reference voltage $V_S$ earlier than voltage $b_2$, and a predetermined time later, the voltage $b_2$ reaches the reference voltage. Consequently, after lapse of time $t_1$ subsequent to the closure of switch SW, the output ($c_1$) of the comparator $CP_{21}$ becomes the low level "L". In the same manner, after lapse of time $t_2$, the output ($d_1$) of comparator $CP_{22}$ becomes the low level, these outputs being sequentially outputted as time up outputs.

When the switch SW is opened, the charges of capacitors $C_{21}$ and $C_{22}$ discharge through diodes $D_{21}$ and $D_{22}$, respectively, and when switch SW is re-closed, the above-described operation is assured.

An oscillator OSC is constituted by resistors $R_{27}$ and $R_{28}$, a capacitor $C_{23}$ and a freerunning multivibrator type intergrated circuit $IC_{21}$, so as to start oscillation of a square wave when the switch SW is closed, thus sending out an oscillation output. This operation of oscillation per se is the same as that of the oscillators in FIGS. 3 and 5.

Accordingly, the output terminal OUT outputs as an oscillation signal a square wave signal having a frequency and duly cycle determined by the values of resistors $R_{27}$, $R_{28}$ and capacitor $C_{23}$ and the level change thereof from "H" to "L" level is derived out by a differentiating circuit made up of a capacitor $C_{24}$, a resistor $R_{29}$ and a noise bypass diode $D_{23}$.

The reset terminal R of the intergrated circuit $IC_{21}$ is connectd to the output terminal of comparator $CP_{21}$ via diode $D_{24}$ so that when the output is changed to the "L" level to provide a final time up output, the integrated circuit $IC_{21}$ is reset to stop oscillation.

An integrated circuit $IC_{22}$ made up of a monostable multivibrator, resistors $R_{30}$, $R_{31}$, a capacitor $C_{25}$ and a transistor $Q_{21}$ constitute a pulse generator PG. Initially, since the discharge terminal DC of the integrated circuit $IC_{22}$ is energized and since the junction between resistor $R_{30}$ and capacitor $C_{25}$ is connected to the discharge terminal DC and the threshold terminal TH, the output terminal OUT is at the low level "L". But, under the application of a differentiated pulse resulting from the output of the oscillator OSC to a trigger terminal TG, the integrated circuit $IC_{22}$ is driven. Then, the discharge terminal DC is deenergized whereby the capacitor $C_{25}$ is charged through resistor $R_{30}$ to gradually increase the terminal voltage of the capacitor $C_{25}$ in accordance with a time constant determined by the values of resistor $R_{30}$ and capacitor $C_{25}$, whereby the output terminal OUT of the integrated circuit $IC_{22}$ changes to the "H" level.

As the terminal voltage of the capacitor $C_{25}$ increases to a preset discharge level, the discharge terminal DC is energized to rapidly discharge the charge of capacitor $C_{25}$ and to change again the output terminal OUT to the "L" level. This "L" level is sustained until the integrated circuit $IC_{22}$ is driven by the next differentiated pulse. By repeating this operation, a pulse output (e) of a duty ratio corresponding to the time constant determined by the values of resistor $R_{30}$ and capacitor $C_{25}$ is sent out of the output terminal OUT of the integrated circuit $IC_{22}$.

When the output $(C_1)$ of the comparator $CP_{22}$ becomes the "L" level, transistor $Q_{21}$ is turned ON so as to connect resistor $R_{31}$ in parallel with resistor $R_{30}$ to decrease the charging time constant of the capacitor $C_{25}$, thus changing the duty cycle of the output pulse (e).

This output (e) is applied to a drive circuit DR constituted by registers $R_{32}$ to $R_{35}$ and transistors $Q_{21}$ and $Q_{23}$. Since these transistors are turned ON only when the output (e) is at the "L" level, an intermittent current (f) flows through the exciting coil L of the electromagnetic coupling apparatus shown in FIG. 1.

Due to the inductance component of the exciting coil L, the current increases gradually, and the current also decreases gradually due to the effects of the inductance component, parallel diode $D_{25}$ and constant voltage diode $ZD_{21}$, thus forming a sawtooth current. However, the mean power increases in accordance with the variation of the duty ratio.

When the output $(d_1)$ of the comparator $CP_{21}$ becomes the "L" level, the oscillator OSC stops oscillation. In response thereto, the pulse output (e) of the pulse generator PG maintains the level "L", and hence the transistors $Q_{22}$ and $Q_{23}$ of the drive circuit DR still maintain ON states to continuously pass current to the exciting coil L so as to maximize the exciting power.

Accordingly, until time $t_1$ lapse subsequent to the closure of switch SW, the exciting coil is energized with a small power level, with a medium power level for a time interval $(t_2-t_1)$, and with a maximum power level after lapse of time $t_2$, whereby the armatures 18 and 19 are sequentially attracted. Since the armatures are attracted by small attractive force and the output pulley 16 slips smoothly, generation of friction noise can be prevented and as the exciting power increases armatures are attracted perfectly, thus effecting a satisfactory cushion coupling.

Figure 7:
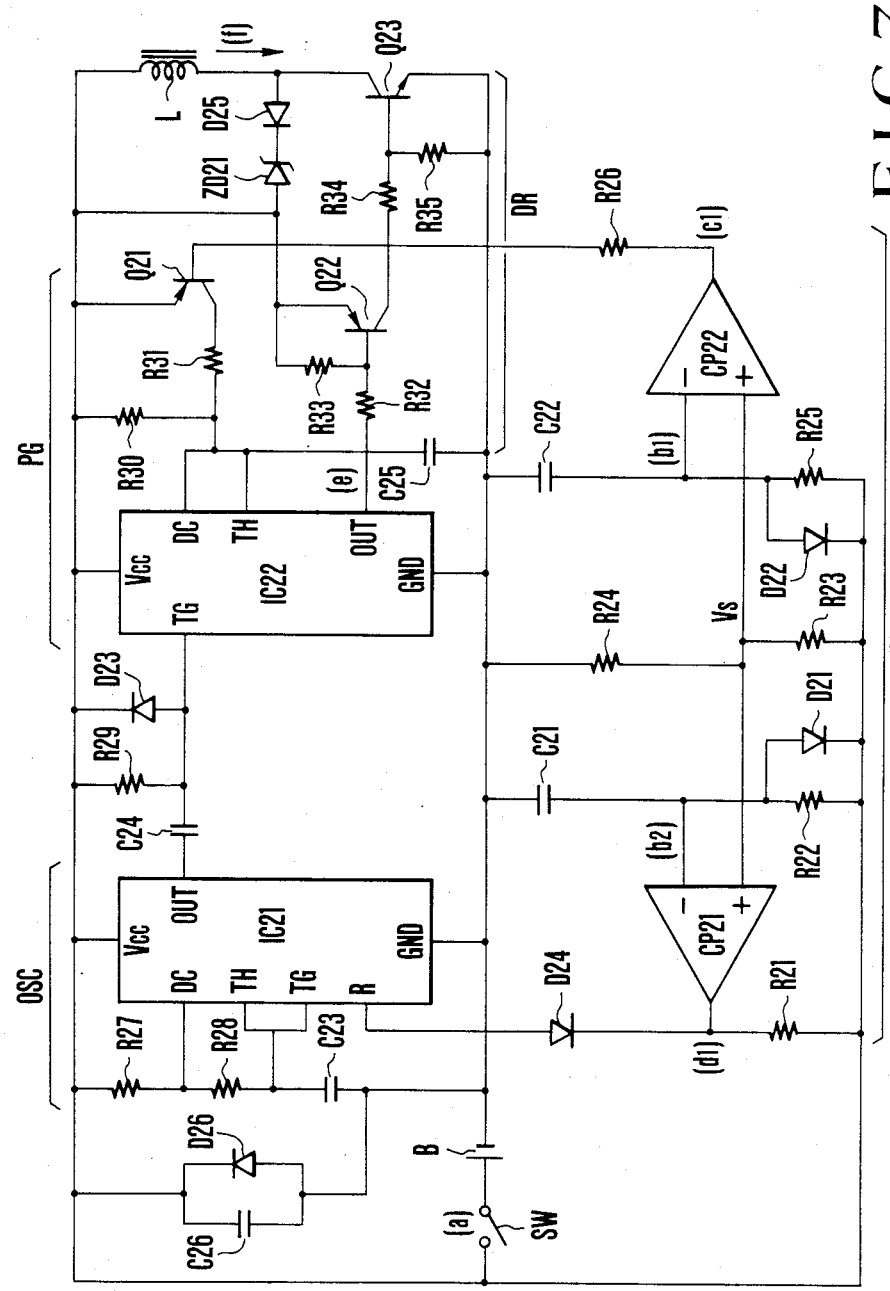
FIG. 7 is a circuit diagram showing a third embodiment of this invention.

In FIG. 7, the constant voltage diode $ZD_{21}$ and diode $D_{25}$ are provided for the purpose of absorbing the back electromotive force created at the time of interrupting the current flowing through the exciting coil L, and limiting the flow time of surge current caused by the back electromotive force so as to control the fall time of the current (f).

Capacitor $C_{26}$ and diode $D_{26}$ are provided for bypassing noise components otherwise entering into the power source circuit so as to prevent erroneous operation.

As the timer TIM, however, a counter for counting clock pulses, or the like, may be used and as the oscillator OSC, another oscillating circuit may be employed similarly. Also, the frequency of the oscillation output (e), or the duty ratio, may be varied to gradually increase the average power, and the construction of the drive circuit DR may be selected according to the requirements.

Further, a gate circuit or the like may be inserted, having the power source B constantly connected, or circuits with an enable terminal, a chip select terminal and the like may be used to be controlled by the switch SW, and varistors and the like may be used in place of the constant voltage diodes ZD, $ZD_{21}$ and diodes $D_3$, $D_{25}$. Various modifications are thus possible.

As clear from the foregoing explanations, since the excitation power gradually increases from low to maximum through the operation of a switch according to the first and second embodiments of this invention, buffer coupling can be effected respectably, and since the excitation power increases stepwise through the operation of a switch according to the third embodiment of this invention, friction noises, coupling delays, etc. are not caused, whereby prominent effects in controlling electromagnetic coupling apparatus having the function of buffer coupling can be obtained.

What is claimed is:

1. A control circuit for electromagnetic coupling apparatus comprising:

a power source switch connected with a power source;

a timer which is started by an operation of said power source switch and comprises a first capacitor charged by said power source through a first resistor and said power source switch, a second capacitor charged by said power source through a second resistor and said power source switch, a buffer amplifier responsive to a potential at a junction between said first capacitor and said first resistor and an inverter connected to a junction between said second capacitor and said second resistor;

an oscillator which starts to send out a pulse shaped oscillation output in response to the operation of said power switch and stops sending out of said oscillation output in response to a time up of said timer; and a drive circuit which intermittently passes current through an exciting coil of said electromagnetic coupling apparatus in accordance with said oscillation output of said oscillator and continuously passes current through said exciting coil when said oscillation output is stopped.

* * * * *